United States Patent [19]
Juntti

[11] Patent Number: 5,835,526
[45] Date of Patent: Nov. 10, 1998

[54] CHANNEL EQUALIZER FOR A TELECOMMUNICATION SYSTEM

[75] Inventor: Juhani Juntti, Puuppola, Finland

[73] Assignee: Nokia Mobile Phones Ltd., Salo, Finland

[21] Appl. No.: 565,239

[22] Filed: Nov. 30, 1995

Related U.S. Application Data

[63] Continuation of Ser. No. 133,718, Oct. 7, 1993, abandoned.

[30] Foreign Application Priority Data

Oct. 12, 1992 [FI] Finland ................................. 924611

[51] Int. Cl.$^6$ ................................ H04B 1/38; H03H 7/30
[52] U.S. Cl. .................................. 375/11; 375/7; 375/15
[58] Field of Search .................................. 375/11, 7, 15

[56] References Cited

U.S. PATENT DOCUMENTS

| | | | |
|---|---|---|---|
| 4,797,898 | 1/1989 | Martinez | 375/7 |
| 4,873,683 | 10/1989 | Broth | 370/95.1 |
| 5,111,481 | 5/1992 | Chen et al. | 375/14 |
| 5,212,684 | 5/1993 | MacNamee et al. | 370/24 |
| 5,249,205 | 9/1993 | Chennakeshu | 375/101 |
| 5,274,670 | 12/1993 | Serizawa | 375/13 |
| 5,283,811 | 2/1994 | Chennakeshu | 375/14 |

FOREIGN PATENT DOCUMENTS

| | | | |
|---|---|---|---|
| 924611 | 6/1993 | Finland . | |
| 458653 | 4/1917 | Sweden | H04B 7/005 |

*Primary Examiner*—Sandra L. O'Shea
*Assistant Examiner*—John Ning
*Attorney, Agent, or Firm*—Perman & Green

[57] ABSTRACT

In accordance with the invention the channel equalization factors in a communication system can be calculated at a base station and transmitted to a mobile station in order to effect the equalization at reception. Alternatively, the channel equalization can be effected at the base station also in connection with the transmission to the mobile station, in addition to the normal equalization made at reception. The construction of the mobile station is simplified when the channel equalizer or the calculation of the equalization factors can be omitted.

15 Claims, 2 Drawing Sheets

CHANNEL EQUALIZER FOR A TELECOMMUNICATION SYSTEM

This application is a continuation of application Ser. No. 08/133,718 filed on Oct. 7, 1993, now abandoned.

FIELD OF INVENTION

This invention relates to a telecommunication system, and particularly to a telecommunication system utilising a channel equalizer.

BACKGROUND TO INVENTION

There are many known types of telecommunication systems, such as Time Division Multiple Access (TDMA), Frequency Division Multiple Access (FDMA) or Time Division Duplex (TDD) Systems.

In a TDD system transmission in opposite directions of the channel is made on the same frequency, but in different time slots. It is known that interference occurs in the channel, and conventionally a channel equalizer is arranged in the receiving end of the channel in order to equalize it. The function of the channel equalizer is to equalize the received signal with circuitry known as an equalizer.

The channel equalizer can be realized in many different ways. In known digital systems it is preferably realised by a microprocessor and an algorithm stored in the memory of the microprocessor. Effective equalization requires an extensive algorithm and a fast equalizer, which uses a large amount of calculation power and correspondingly increases the cost of the receiver.

As an example, we can consider a system that contains a base station and a mobile station, e.g. a cordless phone. The cordless phone transmits to the base station, which in a known way calculates the equalization factors and equalizes the signal received from the channel. Then the base station transmits to the cordless phone the equalization factors it has calculated and the phone uses these equalization factors to equalize the signal received from the channel.

The development of the invention is based on the observation, that when transmission and reception is effected on the same frequency or at frequencies close to each other, the same channel equalizer can be used in both directions. This is the situation particularly when linear equalizers are used, whereby in principle it does not make any difference in which order the channel and the equalizer are placed. In the above example of the base station and the cordless phone it is thus natural to make the channel equalization at the base station, which then in the usual way equalizes the information it receives, but further it also equalizes the information it transmits, already before it is transmitted on the channel. Then no equalizer is required in the cordless phone.

BRIEF SUMMARY OF INVENTION

The present invention addresses at least some of the foregoing drawbacks and problems, and provides a telecommunication system comprising a first transmit/receive (tx/rx) means and a second transmit/receive means, a communications channel for said first tx/rx means to communicate with said second tx/rx means, and channel equalisation means for calculating and utilising channel equalisation factors, wherein said channel equalisation factors are calculable in a predetermined one of said first and second tx/rx means.

This has the advantage that the relatively complex channel equalisation factor calculating circuitry can be located at the most suitable part of the telecommunication system.

Preferably, a part of the channel equalisation factors are transmitted from the predetermined one of the first and second tx/rx means to another of the first and second tx/rx means and a feedback part of the channel equalisation means is disposed in the predetermined one of the first and second tx/rx means. This has the advantage that channel equalising circuitry can be located at another tx/rx means for equalising signals received thereat using channel equalisation factors calculated at a chosen tx/rx means. This removes the need for having channel equalising factor calculating circuitry at the another tx/rx means.

Alternatively a feedforward part of the channel equalisation means is disposed in the predetermined one of the first and second tx/rx means, and a feedback part of the channel equalisation means is disposed in the predetermined one of the first and second tx/rx means which has the advantage that equalisation is only performed at a predetermined tx/rx means. Thus, the relative complex circuitry for equalising signals and calculating the equalisation factors can be disposed in the most suitable or cost advantageous part of the telecommunication system.

Suitably, the channel equalising means comprise non-linear DFE channel equalisers, linear channel equalisers and adaptive channel equalisers, which are well known in the art and would be relatively simple to implement in the invention.

Typically, the communication system would be a radio telephone system such as a cellular system and the predetermined tx/rx means would be a base station thereof and the another tx/rx means would be a mobile station thereof.

DETAILED DESCRIPTION OF EMBODIMENTS OF THE INVENTION

A detailed description of embodiments of the invention is presented here below, by way of example only, and with reference to the accompanying drawings.

Figure 1:
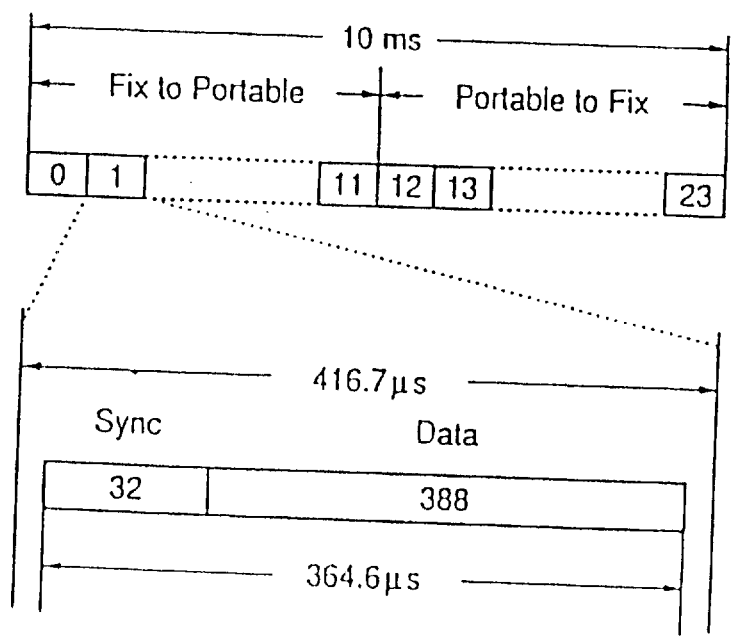
FIG. 1 shows the frame structure of the DECT system.

In a TDD system, for example, a base station and a cordless phone communicate through a radio channel. The telephone and the base station function in accordance with the standardized DECT system (Digital European Cordless Telephone), the frame structure of which is shown in FIG. 1. The frame comprises a 10 ms long period, in which 12 time slots are reserved for each direction. The base station transmits to the telephones (Fix to Portable) in time slots 0 . . . 11, and the telephones transmit to the base station (Portable to Fix) in time slots 12 . . . 23. As is seen in the figure, each time slot comprises a period of 416,7 microseconds or a burst containing a synchronization section (Sync) and a data section (Data). FIG. 1 shows that the same base station can communicate simultaneously with one or more telephones, whereby for duplex communication each telephone can use at least one time slot in both directions.

According to FIG. 1 the frame length is 10 ms. In a conventional approach both the base station and the cordless phone receivers equalize the received signal. Because the frame is so short, we can with good reason assume that the channel remains unchanged for at least 5 milliseconds, or the time between transmission and reception. In other words, it suffices that the base station calculates the equalizing factors for the equalizer at the moment of reception, and when the communication direction for the respective telephone is reversed after 5 milliseconds, then the telephone can use the same equalizing factors which the base station already calculated, and the base station transmits them to the telephone at the beginning of the burst. During the next frame or communication period the base station again calculates the required equalization factors, and in this way the operation continues.

Alternatively the base station can also have a channel equalizer in the transmission direction, whereby this transmission direction equalizer uses the factors which the base station calculated at reception. As was mentioned above, this will work when the duplex period is sufficiently short, so that the cannel remains unchanged during one frame.

Figure 2:
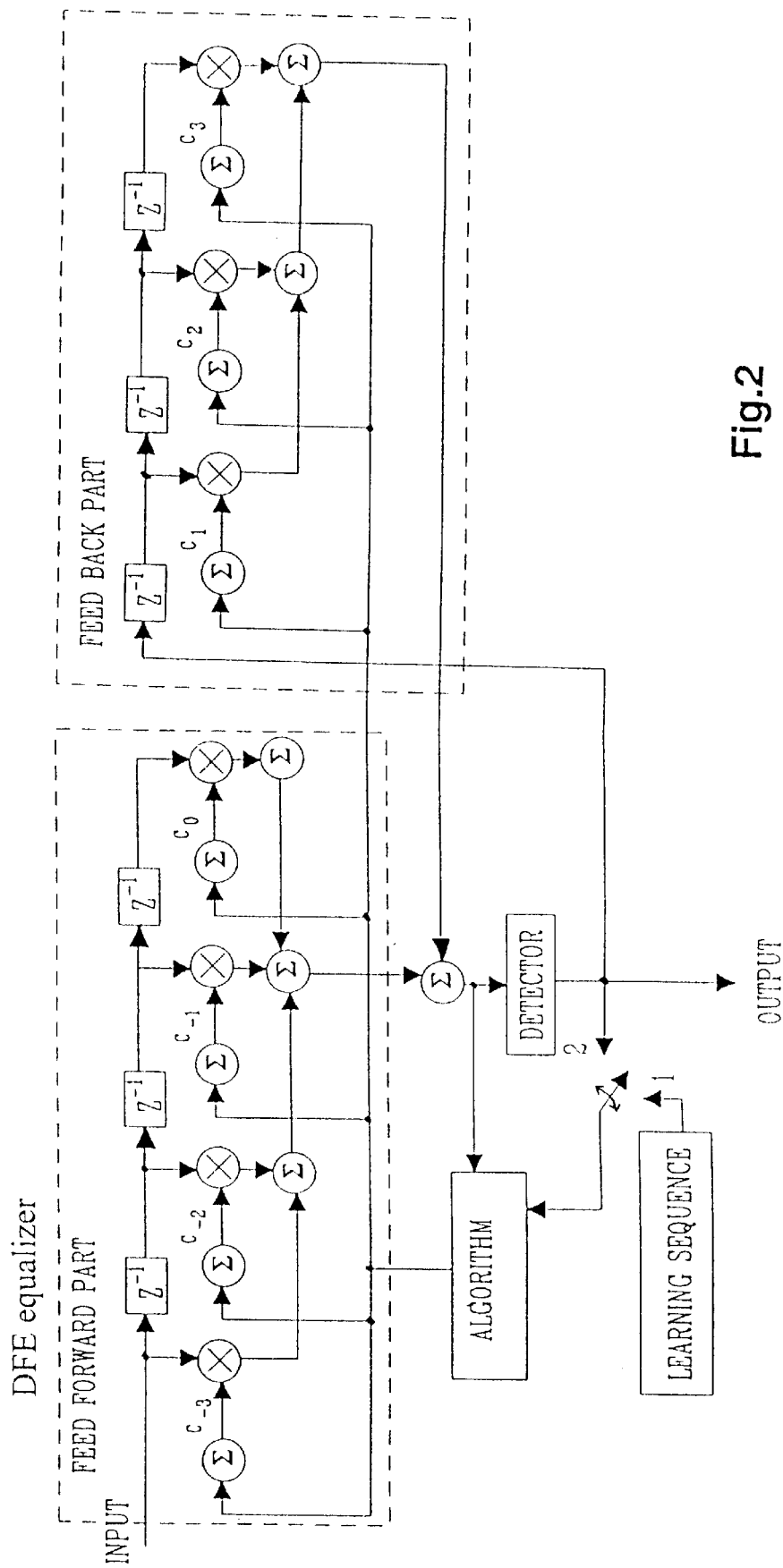
FIG. 2 shows the block diagram of a DFE equalizer.

As a non-linear equalizer we can use e.g. the DFE equalizer (Decision Feedback Equalizer) of FIG. 2, known as such. An equalizer of this kind comprises shift registers, multiplication and addition operations, as is described e.g. in the book Proakis: Digital Communications, McGraw-Hill Books Company, New York, 1989.

The DFE equalizer comprises two parts: a feedforward or a feedback part. The equalizer further must contain an algorithm for the calculation of the equalization factors. Usually the operation of the equalizer begins with a learning sequence (the switch of FIG. 2 in position 1), whereby a known data sequence is transmitted in the channel. During the sequence the algorithm calculates the factors for the equalizer. When the learning sequence is ended, then the operation is switched to a data controlled state (the switch of FIG. 2 in position 2), in which the equalization decisions just made are utilized in the calculation of the equalization factors.

The channel equalizers can calculate the equalization factor values during the learning sequence, or then they are continuously updated. In the presented method, however, the mobile receiver uses the same factors during the transmission of the whole burst. This is possible, because we can assume that the channel remains unchanged during the transmission of the whole burst.

Such calculation of the equalizer factors in real time requires exhaustive calculations. In accordance with the invention this calculation capacity can now be centralized in the base station. Correspondingly, when the factor calculation can be omitted in the mobile station, e.g. a cordless phone, it will be substantially simplified.

As an equalizer algorithm we preferably use some recursive algorithm known to a person skilled in the art. In the equalizer of FIG. 1 it is also possible to use complex units.

The feedforward part of the DFE equalizer can be placed in the transmitter, whereby only the factors for the feedback part must be transmitted to the receiver.

In accordance with a second aspect of the invention the mobile station will be even more simplified, if channel equalization is performed in the base station for both transmission directions.

In a frequency division duplex (FDD) system the method presented here will work when the frequencies are sufficiently close to each other, whereby the channel would be substantially identical in both transmission directions.

Although the present examples deal with a cordless phone operating in the DECT system, a person skilled in the art understands that the method according to the invention can also be used in other TDD systems for the communication between a base station and mobile equipment. The invention is further not limited to be used only in mobile stations, but as well the method can be applied to communication between two or more fixed or stationary stations communicating on the same frequency in both directions and having a sufficiently short frame structure, so that the communication conditions remain sufficiently unchanged between the transmissions in the opposite directions.

In view of the foregoing description it will be evident to a person skilled in the art that various modifications may be made within the scope of the invention.

The scope of the present disclosure includes any novel feature or combination of features disclosed therein either explicitly or implicitly or any generalisation thereof irrespective of whether or not it relates to the claimed invention or mitigates any or all of the problems addressed by the present invention. The applicant hereby gives notice that new claims may be formulated to such features during prosecution of this application or of any such further application derived therefrom.

What we claim is:

1. A telecommunication system comprising:
   i) a first transmit/receive (tx/rx) means and a second transmit/receive means;
   ii) a communication (tx/rx) channel for said first tx/rx means to communicate with said second tx/rx means; and
   iii) channel equalization means for calculating and for utilizing channel equalization factors, wherein said channel equalization factors are calculable in a first one of said first and second tx/rx means and are transmitted through said communication channel, during a transmit time period, from said first one of said first and second tx/rx means that calculates the channel equalization factors to a second one of said tx/rx means that utilizes said channel equalization factors for generating an equalization to be applied for equalizing a received communication signal that is also transmitted from said first one of said first and second tx/rx means during the transmission time period.

2. A telecommunication system as set forth in claim 1, wherein only a part of said channel equalization factors are transmitted from said first one of said first and second tx/rx means to said second one of said first and second tx/rx means during the transmit time period.

3. A telecommunication system as set forth in claim 2, wherein said channel equalization means is comprised of a feedforward part and a feedback part, wherein said feedforward part of said channel equalization means is disposed in said first one of said first and second tx/rx means, and wherein said feedback part of said channel equalization means is disposed in said second one of said first and second tx/rx means and only channel equalization factors for said feedback part are transmitted to said second one of said first and second tx/rx means through said communication channel.

4. A telecommunication system as set forth in claim 1, wherein said channel equalization means is a non-linear decision feedback channel equalizer.

5. A telecommunication system as set forth in claim 1, wherein said channel equalization means is a linear channel equalizer.

6. A telecommunication system as set forth in claim 1, wherein said equalization means is an adaptive channel equalizer.

7. A telecommunication system as set forth in claim 1, wherein said telecommunication system is a radio telephone system.

8. A telecommunication system as set forth in claim 7, wherein said first one of said first and second tx/rx means is a base station and wherein said second one of said first and second tx/rx means is a mobile station.

9. A telecommunication system as set forth in claim 1, wherein said telecommunication system is a time division multiple access system.

10. A telecommunication system as set forth in claim 1, wherein said telecommunication system is a frequency division multiple access system.

11. A telecommunication system as set forth in claim 1, wherein said second one of said first and second tx/rx means is a radiotelephone comprised of a feedback portion of said channel equalization means, wherein said first one of said first and second tx/rx means is a base station comprised of a feedforward portion of said channel equalization means, and wherein said radiotelephone receives, from said communication channel, equalization factors only for said feedback portion of said channel equalization means.

12. A telecommunication system comprising:
   i) a first transmit/receive (tx/rx) means and a second transmit/receive means;
   ii) a communication (tx/rx) channel for said first tx/rx means to communicate with said second tx/rx means; and
   iii) channel equalization means for calculating and for utilizing channel equalization factors, wherein said channel equalization factors are calculable in a first one of said first and second tx/rx means and are transmitted through said communication channel, during a transmit time period, from said first one of said first and second tx/rx means that calculates the channel equalization factors to a second one of said tx/rx means that utilizes said channel equalization factors for generating an equalization to be applied for equalizing a received communication signal that is also transmitted from said first one of said first and second tx/rx means during the transmission time period, wherein a feedforward part of said channel equalization means is disposed in said first one of said first and second tx/rx means;
   a feedback part of said channel equalization means is disposed in said second one of said first and second tx/rx means; and
   only channel equalization factors for said feedback part are transmitted to said second one of said first and second tx/rx means.

13. A method for operating a radiotelephone system having a base station and at least one mobile station, the base station and mobile station bidirectionally communicating with radio frequency signals through a communication channel during respective transmit and receive time slots, comprising the steps of:

receiving a transmission at the base station from the mobile station during a base station receive time slot;

determining in the base station a plurality of channel equalization factors based on the received transmission, the plurality of channel equalization factors reflecting a current radio frequency propagation characteristic of the communication channel;

during a next base station transmit time slot, transmitting at least a portion of the determined channel equalization factors to the mobile station, along with communication information;

receiving the transmitted portion of the channel equalization factors and the communication information with the mobile station; and using the received channel equalization factors to equalize, in the mobile station, the received communication information in accordance with the current radio frequency propagation characteristic of the communication channel.

14. A method as set forth in claim 13 wherein the base station determines equalization factors having a feedforward component and a feedback component, and wherein only the feedback component is transmitted to the mobile station along with communication information.

15. A method as set forth in claim 14 wherein the base station receive time slot and the next base station transmit time slot are spaced apart in time by an amount during which the radio frequency propagation characteristic of the communication channel does not significantly change.

\* \* \* \* \*